United States Patent
McCombs et al.

(10) Patent No.: US 9,053,362 B2
(45) Date of Patent: *Jun. 9, 2015

(54) SYSTEM AND METHOD FOR CAPTURING RELEVANT INFORMATION FROM A PRINTED DOCUMENT

(71) Applicant: Ancestry.com Operations, Inc., Provo, UT (US)

(72) Inventors: Peter McCombs, Orem, UT (US); Spence Koehler, Sandy, UT (US); Laryn Brown, Highland, UT (US)

(73) Assignee: Ancestry.com Operations Inc., Provo, UT (US)

(*) Notice: Subject to any disclaimer, the term of this patent is extended or adjusted under 35 U.S.C. 154(b) by 0 days.

This patent is subject to a terminal disclaimer.

(21) Appl. No.: 14/174,733

(22) Filed: Feb. 6, 2014

(65) Prior Publication Data
US 2014/0247988 A1    Sep. 4, 2014

Related U.S. Application Data

(63) Continuation of application No. 13/242,736, filed on Sep. 23, 2011, now Pat. No. 8,687,890.

(51) Int. Cl.
| G06K 9/34 | (2006.01) |
|---|---|
| G06K 9/20 | (2006.01) |
| G06K 9/00 | (2006.01) |

(52) U.S. Cl.
CPC .......... *G06K 9/00469* (2013.01); *G06K 9/2054* (2013.01)

(58) Field of Classification Search
USPC ......... 382/162, 164, 173, 175–178, 181, 227, 382/229, 275, 282, 292, 310, 317; 704/9
See application file for complete search history.

(56) References Cited

U.S. PATENT DOCUMENTS

| 4,741,045 A * | 4/1988 | Denning ..................... 382/178 |
| 6,052,480 A * | 4/2000 | Yabuki et al. ................ 382/178 |
| 8,687,890 B2 * | 4/2014 | McCombs et al. ........... 382/176 |
| 2013/0077863 A1 * | 3/2013 | McCombs et al. ........... 382/176 |
| 2013/0080149 A1 * | 3/2013 | McCombs et al. ............... 704/9 |

* cited by examiner

*Primary Examiner* — Amir Alavi
(74) *Attorney, Agent, or Firm* — Kilpatrick Townsend & Stockton LLP

(57) ABSTRACT

A city directory, having a listing of names and associated information of residents in a city (or similar location), is digitized. Zones of text having information not useful to users of the digitized directory are removed, and lines of information corresponding to residents are reconstructed, to make the digitized directory more easily accessed and reviewed.

22 Claims, 28 Drawing Sheets

112

SPERRY'S STOCKTON FLOUR — LEADS THEM ALL

| 494 | LOS ANGELES [ O ] DIRECTORY. |

O'Brien William, res 943 Aliso
O'Brien William (Rowan & O'Brien) res 106 North Main
O'Bryan Charles, plasterer, res 556 Wall
O'Bryan John F., tuckpointer, res 117 West Fifteenth
O'Bryan John L., real estate, 112 South Spring, res 2529 East First
O'Connell Timothy, teamster, res Vigo House
O'Connor Christopher, horseshoer G. L. Grimston, res 239½ South Main
O'Connor Daniel, harness cleaner Ausin & Reichard, res 373 North
   Main
O'Connor Daniel J., painter, res 2600 New York Av
O'Connor Dennis, tracklayer S. P. Co., res 209 Sotello
O'Connor John, farmer, res Somerset House
O'Connor John J., detective McCarthy's Detective Agency, res 316 East
   First
O'Connor John J. Jr., bricklayer, res 914 East Sixth
O'Connor Joseph, shoemaker F. Mathews, res 416 North Main
O'Connor Mollie A. Miss, teacher Spring-street School, res 138 North
   Bunker Hill Ave.
O'Connor Patrick, gripman Pac. Ry., res 727½ South Grand Av
O'Dea Bridget, widow, res 450 East Fifteenth
O'Dea Michael F. (Burbank, Baker & O'Dea) res 450 East Fifteenth
O'Donnell A. Mrs., lodgings 111½ South Broadway
O'Donnell Charles, horse clipper, 114 East First
O'Donnell Charles, laborer, res 355 North Broadway
O'Donnell George H., molder L. A. Pioneer Iron Foundry, res 459 Commercial
O'Donnell James F., optician and second-hand books, 405½ South Spring
O'Donnell James W., machinist L. A. Pioneer Iron Foundry, res 459 Com-
   mercial
O'Donnell John, res Grand Central Hotel
O'Donnell John, laborer, res San Fernando and Sotello
O'Donnell Patrick N., proprietor L. A. Pioneer Iron Foundry, res Manhattan Station
O'Donnell Thomas, laborer, res 130½ North Los Angeles
O'Donnell William C., news agent S. P. Co., res 111½ South Broadway
O'Donoughue Jennie Miss, copyist Abstract and Title Insurance Co., res 626 West
   Fifteenth
O'Donoughue Julia A., widow, res 626 West Fifteenth
O'Donoughue Maggie Miss, teacher Thirtieth-street School, res 626 West Fifteenth
O'Gara Edward (Lovie, Dodd & Co.) res 113 North Bunker Hill Av
O'Gorman Ella F. Mrs., teacher Garey-street School, res 229 North Broadway
O'Gorman Michael M., manager L. A. Granite and Brown Stone Co., 175 North Spring,
   res 229 North Broadway
O'Hanlon John R., barkeeper, res 1036 Temple
O'Hara Edward, farmer, res Chavez Tract

C. L. DINGLEY & CO., LUMBER CARGOES, 29 STEUART ST. SAN FRANCISCO

WILLIAM J. DINGEE, Real Estate, 460 AND 462 EIGHTH ST., OAKLAND, CAL.

FIG.1

INDEX TO ADVERTISEMENTS.

|  | Page |
|---|---|
| Abbott E W | 159 |
| Abrey George T | 154 |
| Acme White Lead and Color Works | 1860 |
| Alger, Smith & Co | 123 |
| Allen Thomas & Son | 1725 |
| Allison W H | 162 |
| Althea Toilet Co | right top lines |
| American Brass and Metal Works | 110 |
| American Exchange National Bank | 205 |
| American Harrow Co | opp 1811 |
| American Injector Co | 1817 |
| American Land and Title Register Assn | 1922 |
| American Loan and Investment Co | 133 |
| Anderson W H & Son | 151 |
| Applebaum P S | 1826 |
| Arlington Hotel | 147 |
| Armstrong B & Co | 154 |
| Ashwell W H & Co, left bottom lines in Business Directory | |
| Atcheson Cache Co | 160 |
| Avenue Bakery | 159 |
| Backus A Jr & Sons right bottom lines and opp | 1835 |
| Bader George T | 149 |
| Bailie Brothers | 138 |
| Baisch John F | 165 |
| Baker Robert S | opp 1708 |
| Bardeen Paper Co | opp 1808 |
| Barnes Safe and Lock Co | 1886 |
| Barnum E T | 157 |
| Barry Joseph | 165 |
| Baulch F | 151 |
| Beaubien Richard | opp 1815 |
| Beck & Knight | 148 |
| Beebe H A & Co | 161 |
| Belanger Joseph | 139 |
| Belle Isle Ice Co | 1815 |
| Beller Jacob | opp 1735 |
| Bennett Drs C T & Rorick | 187 |
| Benoit J P | 189 |
| Berry Brothers (Ltd) | front edge |
| Bersey John | 1786 |
| Beutler J C | 157 |
| Billings & Drew | left top lines |
| Blessed John & Son | 167 |
| Blitz Louis & Co | 168 |
| Bloss George | 177 |
| Bock Paul | 159 |
| Bock, Schoeneweg & Gast | 189 |
| Bolles J E & Co | 2 |
| Bolotz Rudolph Mnfg Co | 167 |

INDEX EXCLUSION

LOOK FOR THE PATTERN OF..... LEADING TO A NUMBER.
TAG THESE ZONES.

Ward Boundaries, DETROIT CITY DIRECTORY. *Election Districts.*

Kinstry avenue and line of McKistry avenue extended north to city limits.
　*15—The Fifteenth Ward* is bounded on the south by Detroit river, on the north by city limits, on the western Mt. Elliott avenue and on the east by city limits.
　*16—The Sixteenth Ward* is bounded on the south by Detroit river, on the north by city limits, on the east by McKinstry avenue and line of McKinstry avenue extended north to city limits, on the west by city limits.

ELECTION DISTRICTS.
　*First Ward,* First District—All that portion thereof lying south of the center line of Congress street.
　　Second District—All that portion thereof lying between the center lines of Gratiot avenue and Congress street.
　　Third District—All that portion thereof lying between the center lines of Elizabeth street and Gratiot avenue.
　　Fourth District—All that portion thereof lying between the center lines of Alfred and Elizabeth streets.
　　Fifth District—All that portion thereof lying between the center lines of Willis avenue and Alfred street.
　　Sixth District—All that portion thereof lying between the center lines of Ferry and Willis avenues.

ing between the center lines of Alexandrine avenue and Trombly street.
　　Sixth District—All that portion thereof lying north of the center line of Trombly street.
　*Fourth Ward,* First District—All that portion thereof lying south of the center line of Abbott street.
　　Second District—All that portion thereof lying between the center lines of Abbott and Beech streets.
　　Third District—all that portion thereof lying between the center lines of Beech street and Grand River avenue.
　　Fourth District—All that portion thereof lying between the center lines of Grand River avenue and Pitcher street.
　　Fifth District—All that portion thereof lying between the center lines of Pitcher street and Willis avenue.
　　Sixth District—All that portion thereof lying between the center lines of Willis and Warren avenues.
　　Seventh District—All that portion thereof lying between the center lines of Warren and Holden avenues.
　　Eighth District—All that portion thereof lying north of the center line of Holden avenue.
　*Fifth Ward,* First District—All that portion thereof lying south of the center line of Monroe avenue; the easterly boundary thereof, from the south line of Jefferson avenue to the

PARAGRAPH EXCLUSION

LOOK FOR INDENT, THEN CAP, FOLLOWED BY SUBSEQUENT LINES WITH FULL LEFT ALIGNMENT. TAG.

FIG. 9

*Fire Department.* MISCELLANEOUS INFORMATION. *Fire Alarm Boxes.* [39]

10—Ste. Claire Hotel, Randolph street and Monroe avenue.
12—Michigan avenue and First street.
12—Michigan avenue and Fourth street.
13—Michigan and Wastington avenues.
13—Rowland and State streets
14—Engine House No 3, Clifford street.
14—Wilcox avenue and Farrar street.
15—Woodward and Gratiot avenues.
16—Detroit Opera House.
17—Monroe avenue and Farmer street.
17—Randolph street and Gratiot avenue.
18—Randolph street and Madison avenue.
19—Lyceum Theatre, Randolph street.
21—Randolph and Congress streets.
21—Randolph and Larned streets.
23—Vinton & Co., 126 Woodbridge street east.
24—D. M. Ferry & Co.'s Seed House, Brush street.
25—Brush and Atwater Streets.
25—Jefferson avenue and Brush street.
26—Hastings and Atwater streets.
27—Riopelle and Atwater streets.
28—St. Aubin avenue and Atwater street.
28—Dubois and Franklin streets.
29—Chene and Atwater streets.
31—McDougall avenue and Wight street.
32—Jefferson avenue and Adair street.
34—Frost's Woodenware Works.
35—Berry Bros.' Varnish Works.
36—Michigan Bolt and Nut Works.
37—Detroit Stove Works.
38—Jefferson and Field avenues.
38—Hook and Ladder House No. 6, Concord avenue near Congress street.
39—Jefferson and Meldrum avenues.
41—Fort and Beaubien streets.
42—St. Antoine street and Monroe avenue.
43—Hook and Ladder House No. 2, Larned and St. Antoine streets.
45—Hastings and Macomb streets.
45—Engine House No. 2, Hastings street, between Larned and Congress streets.
46—Clinton avenue and Rivard streets.
46—Rivard and Fort streets.
47—Russell and Catherin streets.
48—Russel street and Monroe avenue.
49—Rivard street and Jefferson avenue.
51—Orleans and Fort streets.
51—Enigne House No. 9, Larned and Riopelle

[STREETS]

52—Dequindre street and Monroe avenue.
53—Orleans and Main streets.
53—Orleans and Multiple streets.

ADDRESS FIRST DIRECTORIES
IF MORE THAN 25% OF THE LINES IN THE ZONE BEGIN WITH A NUMBER, REJECT THE ENTIRE ZONE.

FIG.10

Listings

TURNQUIST John E carp h 160 Granite
TURVA Co-operative Store grocers 2 Garfield
TUTTLE George H sales h 223 Independence av
TUTTON M Samuel stone cutter h 97 Glencoe pl
TWITCHELL Edward bkpr B h 400 Highland av
Georgia E wid Virgil V b 51 Berlin
TWOHEY Daniel M produce h Safford next W Squantum
Michael D lab b D M Twohey's Safford

Wrapped Lines

Granite
ers 2 Garfield
dependence av
h 97 Glencoe pl
400 Highland av
Berlin
Safford next W Squantum
Safford

Reconstructed Lines

- Rebuild any indented lower case lines
  - TURVA Co-operative Store grocers 2 Garfield
  - TUTTLE George H sales h 223 Independence ave
  - TUTTON M Samuel stone cutter h 97 Glencoe pl
- Rebuild any indented line beginning with a number (0-9)
  - TWITCHELL Edward bkpr B h 400 Highland av
- Classify remaining indents. If there is a double indent (indicating a wrapped line), reconstruct lines
  - TURNQUIST John E carp h 160 Granite
  - Georgia E wid Virgil V b 51 Berlin
  - TWOHEY Daniel M produce h Safford next W Squantum
  - Michael D lab b D M Twohey's Safford Double Indent

Listings

FLETCHER ANNE C (Mrs Earl H Jr) branch mgr
    Framingham National Bank Ashland
    Branch h67 Cedar Hill rd
" Charlotte wwid Hugh supvr Mary Jane
    Nursing Home h83 Homer av
" Earl H Jr (Anne C) emp DMfgCo h67
    Cedar Hill rd
Flood Richd H (Eunice McG)emp Best-Pak
    Co Natick h11 Metcalf av
Floyd Kenneth L (E Stephanie) emp Natick
    h62 Cedar Hill rd
" Wm A emp Fenwal res Westboro
Flynn Edw j t79 Main
" Rita E emp Fenwal res Cordaville
" Wm (Patricia) factory wkr h65 Pleasant
Foley David E (Evelyn) emp Natick h139
    Prospect
Folkes John j emp Fenwal h65 Oregon rd
" Warren F (Esther) public relations man
    h65 Oregon rd

Double Indent

Wrapped Lines

Framingham National Bank Ashland
Branch h67 Cedar Hill rd
Nursing Home h83 Homer av
Cedar Hill rd
Co Natick h11 Metcalf av
h62 Cedar Hill rd
Prospect
h65 Oregon rd

Reconstructed Lines

- Rebuild any indented lower case lines
  - Floyd Kenneth L (E Stephanie) emp Natick h62 Cedar Hill rd
  - "Warren F (Esther) public relations man h65 Oregon rd
- Rebuild any indented line beginning with a number (0-9)
  - NA
- Classify remaining indents. If there is a double indent (indicating a wrapped line), reconstruct lines
  - FLETCHER ANNE C (Mrs Earl H Jr) branch mgr Framingham National Bank Ashland Branch h67 Cedar Hill rd
  - "Charlotte w/d Hugh supvr Mary Jane Nursing Home h83 Homer av
  - "Earl H Jr (Anne C) emp DMfgCo h67 Cedar Hill rd
  - Flood Richd H (Eunice McG)emp Best-Pak Co Natick h11 Metcalf av
  - Foley David E (Evelyn) emp Natick h 139 Prospect

Listings

Crockett Eugene G. farmer, h. Nashua rd. cor. Treble Cove rd.
    Flora A. stenogr (L.), b. Eugene G. Crockett's
Crosby Charles H. farmer, h. Boston rd. n. Lexington rd.
Crosby Frank W. ice and fertilizer dealer, also
    farmer, Lexington rd. n. School lane, h. do. See
    page 581
    George C. farmer, h. Boston rd. n. Tufts' lane
    Lewis A. farmer, h. Boston rd. n. Lexington rd.
    Trimeda, b. Charles H. Crosby's
    Wellington, h. Jones ave.
    William, died Jan. 15, 1905
    William H. flagman, River st. R. R. crossing, h. Maple ave.
Crotty Martin, d. April 7, 1907
    Mary, wid. Martin, h. Rogers n. R. R., N. B.
Crowther William, poulterer, Spring, h. do. S. B.
Cullinan William j. rem. to Somerville Double Indent

Wrapped Lines farmer, Lexington rd n. School lane, h. do. See
page 581

Reconstructed Lines

• Rebuild any indented lower case lines
  • CROSBY FRANK W. ice and fertilizer dealer,
    also farmer, Lexington rd., n. School lane, h.
    do. See page 581

FIG. 14

Listings

CONRAD
-- John H (Edith M) carp h John Wise av
Cook Alice R r rear Main
-- Clarence T (Alice R) h rear Main
-- Horatio G (Alice) h Wood dr
-- Louise M r Walnut pk
-- Lucille S wid Harvey L h 12 Harry Homan's dr
Cool Frederick R (M Pearl) kennel mgr Puttencove Kennels
  h Andrews
Cooney Joseph painter Southern av h do
Coose Amy H Mrs sec Gaybrook Garage Inc Western av r
  Forest
-- Charles R (Amy H) pres Gaybrook Garage Inc Western
  av h Forest
-- Charles R Jr mech Gaybrook Garage Inc r Forest
Corace Esther M Mrs hairdresser Gloucester r 195
  Eastern av

Double Indent

Wrapped Lines h Andrews
Forest
av h Forest
Eastern av

Reconstructed Lines

- Rebuild any indented lower case lines
  - Cool Frederick R (M Pearl) kennel mgr Puttencove Kennels h Andrews
    -- Charles R (Amy H) pres Gaybrook Garage Inc Western av r Forest
- Classify remaining indents. If there is a double indent (indicating a wrapped line), reconstruct lines
  - Coose Amy H Mrs sec Gaybrook Garage Inc Western av r Forest
  - Corace Esther M Mrs hairdresser Gloucester r 195 Eastern av

FIG. 15

Listings

Kadlec Carrol (Norma E) asst treas Stetson Window Corp (Camb) h 20 Pine
Kalapinski Antoni J (Mary E) methods run GE (WL) h 6 Standish rd
Kaler Harold F (Marion E) coast acct (L) h 10 Upton la
Kallenberg Beatrice M wid John C h 1 Ledge rd SL
--Gordon L (Olive) bank clk (B) h 46 Ledge rd
Kalus Bernard (Shirley J) slsmn h 25 Temple rd
Kanosky Morris L (Lillian L) h 813 Summer
Kaplan Geo (Lillian) dental tech (B) h 4 Putney la
Kasilowski Walter F (Zena S) formn GE (RW) (L) h 333 Phillings Pond rd
Kassels Henry (Esther F) dentist (L) h 65 Ledge rd SL
KAY JEWELRY CO, Leo Finkel manager credit jewelers, opticians, guaranteed diamonds and nationally advertised watches, radios, silverplate, cameras and projectors, dinner ware, electrical, appliances 285 Union, Lynn tel LYnn -8123 (See Yellow Page 26)
Keleher Kay R (Helen) mach opr GE (RW) (L) h 12 Bancroft
Keller Geo R (Marcia O) eng GE (RW) (L) h 855 Lowell
Kellett John (Margt A) electri h Edgemere rd
Kelley Everett J (Sally T) control acct GE (RW) (L) h 41 Fairview rd SL

Wrapped Lines

20 Pine
rd guaranteed diamonds and...
silverplate, cameras and...
ances 285 Union
SL

Reconstructed Lines

- Rebuild any indented lower case lines
  - Kasilowski Walter F (Zena S) formn GE (RW) (L) h 333 Phillings Pond rd
  - KAY JEWELRY CO, Leo Finkel manager credit jewelers, opticians, guaranteed diamonds and nationally advertised watches, radios, silverplate, cameras and projectors, dinner ware, electrical appliances 285 Union, Lynn tel Lynn-0123 (See Yellow Page 26)
- Rebuild any indented line beginning with a number (0-9)
  - Kadlee Carroll (Norma E) asst treas Steson Window Corp (Camb) h 20 Pine
- Classify remaining indents. If there is a double indent (indicating a wrapped line), reconstruct lines.
  - Kelley Everett J (Sally T) control acct GE (RW) (L) h 41 Fairview rd SL Double Indent

FIG. 16

Listings

Rowe Ella h No Main
　　Fred N (May A) acct (B) h Pond
　　James I (Nettie M) mach (B) h Viaduct c Norwood R F
　　　D C
　　　Samuel carp b Ella Rowe's
Roxbury Screw & Gear Co (Fredrick A Heuser) So Main
Rurak Katie maid at R G Morse's Morse R F D
Russell Frances D ass't Sh San Everett b do
　　William (Lillian M) ass't buyer (B) h Wash pl
Ruth Frank farm hand b C E Dorr's So Main R F D

Double Indent

Wrapped Lines

D C

Reconstructed Lines

- Classify remaining indents. If there is a double indent (indicating a wrapped line), reconstruct lines
　　James I (Nettie M) mach (B) h Viaduct c Norwood R F D C

FIG. 17

Listings

Bowes Mrs Helen G salsn Pearce Cloak
  Co b 35 W Summit av
" Jno F tmstr b 345 E 9th
" Jno T tmstr Crane & Ordway Co r
  345 E 9th
Bowes Martin Reporter St P Dis
  patch rms 454 Jackson
" Wm R rms 35 Summit av
Bowker Arthur L bkpr Robinson C & S
  Co r 410 Iglehart av
" Geo b 247 Aurora av
Bowiby Hail Milton N McLean mngr
  6th s e cor Robert
" Melbourne L expman 95 W 7th r 711
  Laurel av Double Indent

Wrapped Lines

Co b 35 W Summit av
345 E 9th
patch rms 454 Jackson
Co r 410 Iglehart av
6th s e cor Robert
Laurel av

Reconstructed Lines

- Rebuild any indented lower case lines
  - BOWES MARTIN Reporter St Dispatch rms 454 Jackson
- Rebuild any indented line beginning with a number (0-9)
  - "Jno T tmstr Crane & Ordway Co r 345 9th
  - Bowiby Hail Milton M McLean mngr 6th s e cor Robert
- Classify remaining indents. If there is a double indent (indicating a wrapped line), reconstruct lines
  - Bowes Mrs Helen G salsn Pearce Cloak Co b 35 W Summit av
  - Bowker Arthur L bkpr Robinson C & S Co r 410 Iglehart av
  - "Melbourne L expman 95 W 7th r 711 Laurel av

FIG. 18

Listings

Rowe Ella h No Main
　　Fred N (May A) acct (B) h Pond
　　James I (Nettie M) mach (B) h Viaduct c Norwood R F
　　　　D C
　　Samuel carp b Ella Rowe's
Roxbury Screw & Gear Co (Frederick A Heuser) So Main
Rurak Katie maid at R G Morse's Morse R F D
Russell Frances D ass't Sh San Everett b do
　　William (Lillian M) ass't buyer (B) h Wash pl
Ruth Frank farm hand b C E Dorr's So Main R F D Indent Reconstructed Lines

• Rowe Fred...
• Rowe James I...
• Rowe Samuel...
• Russell William...

FIG. 19

Listings

Bowes Mrs Helen G salsn Pearce Cloak
    Co b 35 W Summit av
" Jno F tmstr b 345 E 9th
" Jno T tnstr Crane & Ordway Co r
    345 E 9th
Bowes Martin Reporter St P Dis
    patch rms 454 Jackson
" Wm R rms 35 Summit av
Bowker Arthur L bkpr Robinson C & S
    Co r 410 Iglehart av
" Geo b 247 Aurora av
Bowlby Hall Milton N McLean mngr
    6th s e cor Robert
" Melbourne L expman 95 W 7th r 711
    Laurel av " Style

Reconstructed Lines

- Bowes Jno F...
- Bowes Jno T...
- Bowes Wm R...
- Bowker Geo...
- Bowlby Melbourne L...

FIG. 20

Listings

TURNQUIST John E carp h 160
  Granite
TURVA Co-operative Store grocers 2 Garfield
TUTTLE George H sales h 223 Independence av
TUTTON M Samuel stone cutter h 97 Glencoe pl
TWITCHELL Edward bkpr B h 400 Highland av
  Georgia E wid Virgil V b 51 Berlin
TWOHEY Daniel M produce h Safford next W Squantum
  Michael D lab h D M Twohey's Safford Indent

Reconstructed Lines

• Twitchell Georgia E...
• Twohey Michael D...

FIG. 21

Listings

FLETCHER ANNE C (Mrs Earl H Jr) branch mgr
   Framingham National Bank Ashland
   Branch h67 Cedar Hill rd
" Charlotte wwid Hugh super Mary Jane
   Nursing Home h83 Homer av
" Earl H Jr (Anne C) emp DMfgCo h67
   Cedar Hill rd
Flood Richd H (Eunice McG)emp Best-Pak
   Co Natick h11 Metcalf av
Floyd Kenneth L (E Stephanie) emp Natick
   h62 Cedar Hill rd
" Wm A emp Fenwal res Westboro
Flynn Edw j r179 Main
" Rita E emp Fenwal res Cordaville
" Wm (Patricia) Factory wkr h65 Pleasant
Foley David E (Evelyn) emp Natick h139
   Prospect
Foikes John J emp Fenwal r65 Oregon rd
" Warren F (Esther) public relations man
   h65 Oregon rd

Reconstructed Lines

- Fletcher Charlotte...
- Fletcher Earl H Jr...
- Floyd Wm A...
- Flynn Edw J...

FIG. 22

" Style

Listings

Crockett Eugene G. farmer, h. Nashua rd. cor. Treble Cove rd.
    Flora A. stenog. (L.), b. Eugene G. Crockett's
Crosby Charles H. farmer, h. Boston rd. n. Lexington rd.
Crosby Frank W. ice and fertilizer dealer, also
    farmer, Lexington rd. n. School lane, h. do. See
    page 581
    George C. farmer, h. Boston rd. n. Tufts' lane
    Lewis A. farmer, h. Boston rd. n. Lexington rd.
    Trinneta, b. Charles H. Crosby's
    Wellington, h. Jones ave.
    William, died Jan. 15, 1905
    William H. flagman, River st. R. R. crossing, h. Maple ave.
Crotty Martin, d. April 7, 1907
    Mary, wid. Martin, h. Rogers a. R. R., N. B.
Crowther William, poulterer, Sprong, h. do. S. B.
Cullinan William J. rem. to Somerville Indent

Reconstructed Lines

• Crockett Flora A...
• Crosby George C...
• Crosby Lewis A...
• Crosby Trinneta...
• Crosby Wellington...
• Crosby William...
• Crosby William H...
• Crotty Mary...

FIG. 23

Reconstructed Lines

- Conrad John H...
- Cook Clarence T...
- Cook Horatio G...
- Cook Lousie M...
- Cook Lucille S...
- Coose Charles R...
- Coose Charles R Jr...

Listings

CONRAD
-- John H (Edith M)carp h John Wise av
Cook Alice R r rear Main
-- Clarence T (Alice R) h rear Main
-- Horatio G (Alice) h Wood dr
-- Louise M r Walnut pk
-- Lucille S wid Harvey L h 12 Harry Homan's dr
Cool Frederick R (M Pearl) kennel mgr Puttancove Kennels h Andrews
Cooney Joseph painter Southern av h do
Coose Amy H Mrs sec Gaybrook Garage Inc Western av r Forest
-- Charles R (Amy H) pres Gaybrook Garage Inc Western av h Forest
-- Charles R Jr mech Gaybrook Garage Inc r Forest
Corace Esther M Mrs hairdresser Gloucester r 195 Eastern av Double Dash Style

FIG. 24

Listings

Kadlec Carrol (Norma E) asst treas Stetson Window Corp (Camb) h 20 Pine
Kalapinski Antoni J (Mary E) methods mn GE (WL) h 6 Standish rd
Kaler Harold F (Marion E) coast acct (L) h 10 Upton la
Kallenberg Beatrice M wid John C h 1 Ledge rd SL
—Gordon L (Olive) bank clk (B) h 46 Ledge rd
Kalus Bernard (Shirley I) slsmn h 25 Temple rd
Kantosky Morris L (Lillian L) h 813 Summer
Kaplan Geo (Lillian) dental tech (B) h 4 Putney la
Kasilowski Walter F (Zena S) formn GE (RW) (L) h 333 Phillings Pond rd
Kassels Henry (Esther F) dentist (L) h 65 Ledge rd SL
KAY JEWELRY CO, Leo Finkel manager credit jewelers, opticians, guaranteed diamonds and nationally advertised watches, radios, silverplate, cameras and projectors, dinner ware, electrical, appliances 285 Union, Lynn tel LYnn -0123 (See Yellow Page 26)
Keleher Ray R (Helen) mach opr GE (RW) (L) h 12 Bancroft
Keller Geo R (Marcia O) eng GE (RW) (L) h 855 Lowell
Kellett John (Margt A) electn h Edgemere rd
Kelley Everet J (Sally T) comtrol acot GE (RW) (L) h 41 Fairview rd SL

Reconstructed Lines

• Kallenberg Gordon L....

Em Dash Style

FIG. 25

Listings

Paddock Karl M r Washington e Norton..............11-2
Peirce Frank V r Dean Barrowsville................169-2
Perry Mabel H Miss r East Norton Mass.............101-2
Pierce Chas H r Taunton av..........................57
Pratt John C market Main...........................103
    Residence Mansfield av.....................202

Indent

Reconstructed Lines

• Pratt Residence...

FIG.26

SYSTEM AND METHOD FOR CAPTURING RELEVANT INFORMATION FROM A PRINTED DOCUMENT

CROSS REFERENCES TO RELATED APPLICATIONS

This application is a continuation of U.S. patent application Ser. No. 13/242,736 filed on Sep. 23, 2011, now U.S. Pat. No. 8,687,890 which is hereby expressly incorporated by reference in its entirety for all purposes as if fully set forth herein.

BACKGROUND OF THE INVENTION

With ever expanding use of the Internet, digital content services are becoming increasingly popular. Companies digitize books, official records, and other printed documents, and make them available to subscribing customers. Digitized records are often easier than traditional physical documents to review, search and analyze for various purposes, such as research. Thus, it has become desirable to digitize many historical records to facilitate research.

The most efficient method of digitizing printed records is to electronically scan them and use optical character recognition (OCR) to convert the scanned text to computer readable text. However, historical records are often difficult to use when scanned because of unique formatting of the original document, and also because of graphics and other material not relevant to the likely purpose of use/research of the digitized document. Often some judgment needs to be exercised as to how formatting should be accommodated and as to what data is relevant, leading to a person having to manually review each record page (either before or after using OCR), or alternatively, manually entering data from the record at a keyboard (rather than using OCR).

One example of the difficulties in digitizing records are illustrated by historical "city directories." These directories were published by many different publishers across the United States from the late 1800's to the mid-1900's, and include listings by name of every resident (or nearly every resident/head of household) in a given city. Such directories thus provide a historical snapshot of people and their respective addresses in that city at the time of publication and thus, collectively, are a valuable tool for tracking people across the United States during time periods covered by those city directories. However, city directories often include other, less useful information (unrelated to the names of residents) that make it difficult to use standard OCR methodologies to efficiently capture and use information. If a city directly is simply digitized (using OCR methodologies), the useful information (e.g., names) may be intermingled with less useful information and the format of data in the digitized directory may make the resulting data difficult to access and search by a user.

To illustrate the foregoing, reference is made to FIG. 1, which illustrates one page from a city directory for Los Angeles, Calif., published in 1891. As seen, the directory page 100 includes a listing 110 of names (ordered alphabetically by last name), each name appearing on a line, with some lines wrapping or continuing to the next line (without a person's name appearing on the wrapping line). The listing 110 includes information associated with each name, such as occupation and address (which associated information may also be useful to a researcher attempting to locate individuals by name).

The page 100 also includes information that would normally not be useful to a researcher or user (i.e., a user looking for individuals by name), such as advertising text 112 at the top of the page, adverting text 114 along the side, advertising text 116 at the bottom of the page and a header portion 120 with page number and directory identification. While not shown in FIG. 1, a typical city directory might include other information that would also not be useful, such as indexes, listings ordered by street or address (rather than names), pictorial or graphical advertising, and informational text concerning the city.

As discussed above, for purposes of digitizing the information on the directory page 100, it would be desirable to exclude the information that would not be useful to a user or researcher.

In addition, it would be helpful (for purposes of access and retrieval) to have information on each person in the directory arranged as a single line or entry of computer readable text, ordered alphabetically by the last name of a person, and with each such line having any other useful information associated with the person. For example, as seen in FIG. 1, certain lines are indented (such as those designated by example as 130, 132 and 134), and thus are each a continuation or wrapping line of an immediately preceding line. It would be desirable for any such wrapping line to be combined or merged with its preceding line into a single line or entry of computer readable text.

BRIEF SUMMARY OF THE INVENTION

The present invention provides systems and methods for capturing relevant information from a printed record, such as a city directory. The printed document is digitized. Zones of text are created. If a zone has characteristics indicating the information therein is irrelevant, the zone is removed. The remaining zones have lines of information. Some lines (e.g., wrapping lines) are combined based on predetermined rules. Some lines have words added based on ditto characteristics or designations.

In one embodiment, a method includes scanning arranged information on a document, using character recognition to convert the scanned information into computer readable characters, defining zones of the document, applying rules to the zones in order to identify information in zones that is not relevant, excluding any zones having information that is not relevant, applying rules to the information remaining after the step of excluding, the rules identifying a line in the remaining information that is associated with another line, and combining the identified line and its associated line into a reconstructed line.

BRIEF DESCRIPTION OF THE DRAWINGS

FIG. 1 illustrates one page of a city directory, from which it would be desirable to capture and digitize information.

FIGS. 4 through 10 are illustrations of text zones that are tagged for exclusion or removal during the process of FIG. 3.

FIGS. 12 through 18 illustrate examples of reconstructing wrapping lines in a city directory.

FIGS. 19 through 26 illustrate examples of reconstructing lines involving dittos in a city directory.

DETAILED DESCRIPTION OF THE INVENTION

Figure 2:
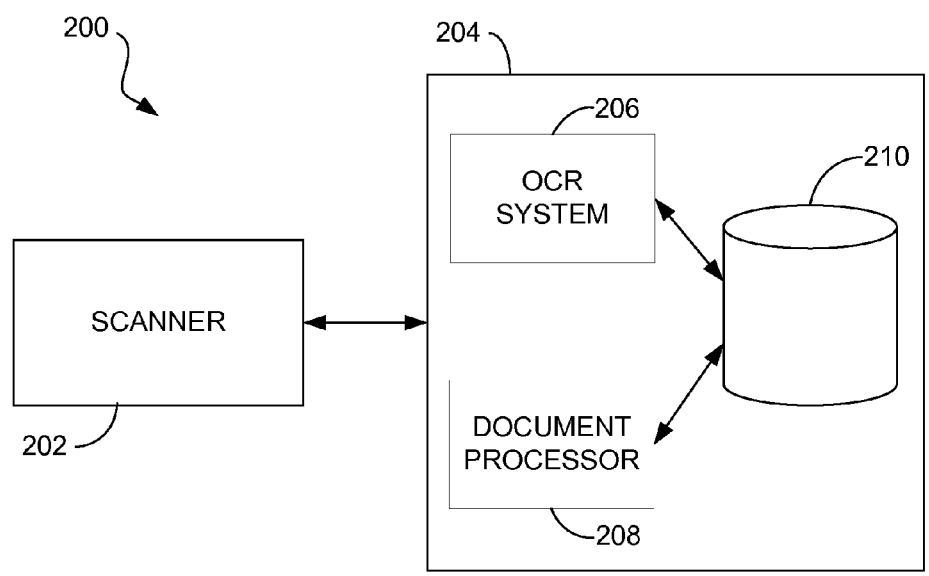
FIG. 2 is a simplified block diagram of a document digitizing system, illustrating one embodiment of the invention.

Embodiments of the invention permit the digitizing of a printed document that has information, some which may be relevant to an anticipated use of the digitized document, and some of which may be irrelevant to the anticipated use of the digitized document. Information that is irrelevant is automatically excluded or discarded from the digitized document using predetermined rules.

In one embodiment, printed information is captured by scanning and using optical character recognition to convert the printed information into computer readable text. Lines of text are assigned to zones.

Zones are evaluated for characteristics according to predetermined zone evaluation rules. The rules are chosen to identify characteristics that are likely to indicate a zone as having irrelevant information. If a zone is identified as irrelevant, it is excluded or removed from the captured text.

Individual lines of the computer readable text remaining after zone exclusion are then evaluated for certain characteristics according to predetermined line evaluation rules. The rules are chosen to identify characteristics that are likely to indicate the lines as having irrelevant information, and to identify lines (such as wrapping lines) that are associated with other lines. Based on the line evaluation, some lines are removed, and some of the remaining lines are combined with others. In some embodiments, words are added to lines that are identified as having a ditto characteristic or designation.

The remaining lines of computer readable text are then stored as the digitized directory, available for access and review by a user/researcher.

In one described embodiment, the document to be digitized is a city directory having names of residents in a city at a specified publication date or period of time. The city directory may also have other useful information associated with a named resident, such as address, occupation, relationship to other residents (e.g., widow of a deceased resident), and so forth. However, the city directory may have other information that is irrelevant, such as advertising text, graphical material, indexes, informational text, headings and so forth. The document is scanned and optical code recognition is used to create computer readable characters and text, and to define text zones. The zones are reviewed to remove zones having advertising, indexes, headings, informational text and other material that may not be useful to a user of the digitized city directory. The remaining zones are then evaluated line-by-line. Lines that are determined to have irrelevant information are removed. Remaining lines are re-constructed, e.g., a wrapped or wrapping line that is a continuation of a prior line, is appended to the prior line. Where a line is determined to have indication of dittos, one or more words may be added to those lines. The resulting lines are then the stored as the digitized city directory, and can be searched for information pertaining to names of people residing in the city at the time of original publication.

While one described embodiment is directed to a city directory (as described earlier in conjunction with FIG. 1), it should be appreciated that the features of the invention can be used in connection with many other types of printed documents, including both historical records (such as voter registration lists, military muster rolls, and vital statistics records), and non-historical records.

Turning briefly to FIG. 2, there is illustrated a simplified block diagram of a document digitizing system 200 for carrying out aspects of the present invention. The system 200 includes a scanner 202 for scanning each page of a printed document, such as a city directory. The scanner 202 is conventional, and pages of the directory may be scanned individually, or automatically (such as by removing the spine of the directory and having the resulting stacked pages automatically fed and scanned at the scanner 202). The system 200 further includes a document processing system 204 that includes an optical character recognition (OCR) system 206 for converting the scanned and digitized images received from the scanner 202 into computer readable text, and a document processor 208 that is programmed for processing the computer readable text from OCR system 206 in accordance with aspects of the invention. Data representing information from the directory and as it may exist during various stages of processing is stored in a memory system 210.

Figure 3:
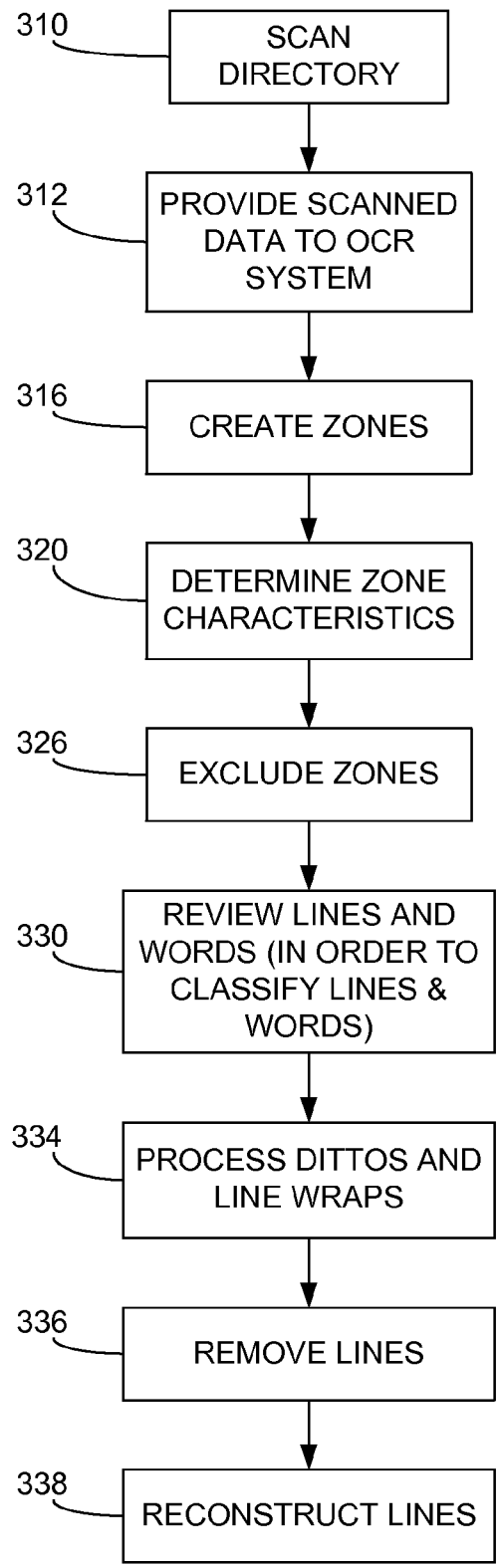
FIG. 3 is a flow diagram illustrating a method for digitizing a city directory according to one embodiment of the invention.

Turning now to FIG. 3, there is shown a general flow diagram of a process for digitizing a city directory. At step 310, the pages of the directory are optically scanned (using scanner 202), and at step 312 the optically scanned data (in the form of images) is provided to the OCR system 206 within processing system 204 for converting the images to computer readable characters and text. While not shown, in some embodiments, the OCR system may also be used to determine if graphics (rather than words and characters) are present on each page of the directory), and in such case the graphics or images may be discarded by the system 204. For example, commercially available OCR systems (such as those to be identified shortly) can be programmed (or have input parameters set) so as to only recognize blocks or zones of text, so that any blocks having graphics can be automatically ignored or discarded during the OCR process.

Next, zones of text are then defined or created by the OCR system for each page of the directory, step 316. Methodologies for defining or creating zones of text on a page by an OCR system are known. Reference can be had to U.S. Pat. No. 5,278,918, issued Jan. 1, 1994, to Bernzott et al, U.S. Pat. No. 6,397,213, issued May 28, 2002, to Cullen et al, and U.S. Pat. No. 7,272,258, issued Sep. 18, 2007, to Berkner et al, each of which is hereby incorporated by reference. Creating text zones can be based on analyzing blank and extraneous characters, white space around blocks of text (e.g., in relation to space between lines), separation borders or rulings, changes in font and alignment of characters, and other well known analysis, such as described in the forgoing referenced patents. In one embodiment, a commercially available system from Abbyy USA Software House, Inc., Milipitas, Calif., is used as OCR system 206, and in particular the ABBYY Recognition Server 3.0, and such commercially available system converts images to computer readable characters/text and creates text zones as described above.

Each zone on each page is then evaluated by system 204 for characteristics that indicate the zone as having data that is likely to be irrelevant to the intended use of the digitized city directory, step 320. In the describe embodiment, six different zone characteristics are evaluated: (1) zone size characteristics, (2) zone format characteristics, (3) lower case characteristics, (4) index characteristics, (5) paragraph characteristics, and (6) address/number first characteristics.

Figure 4:
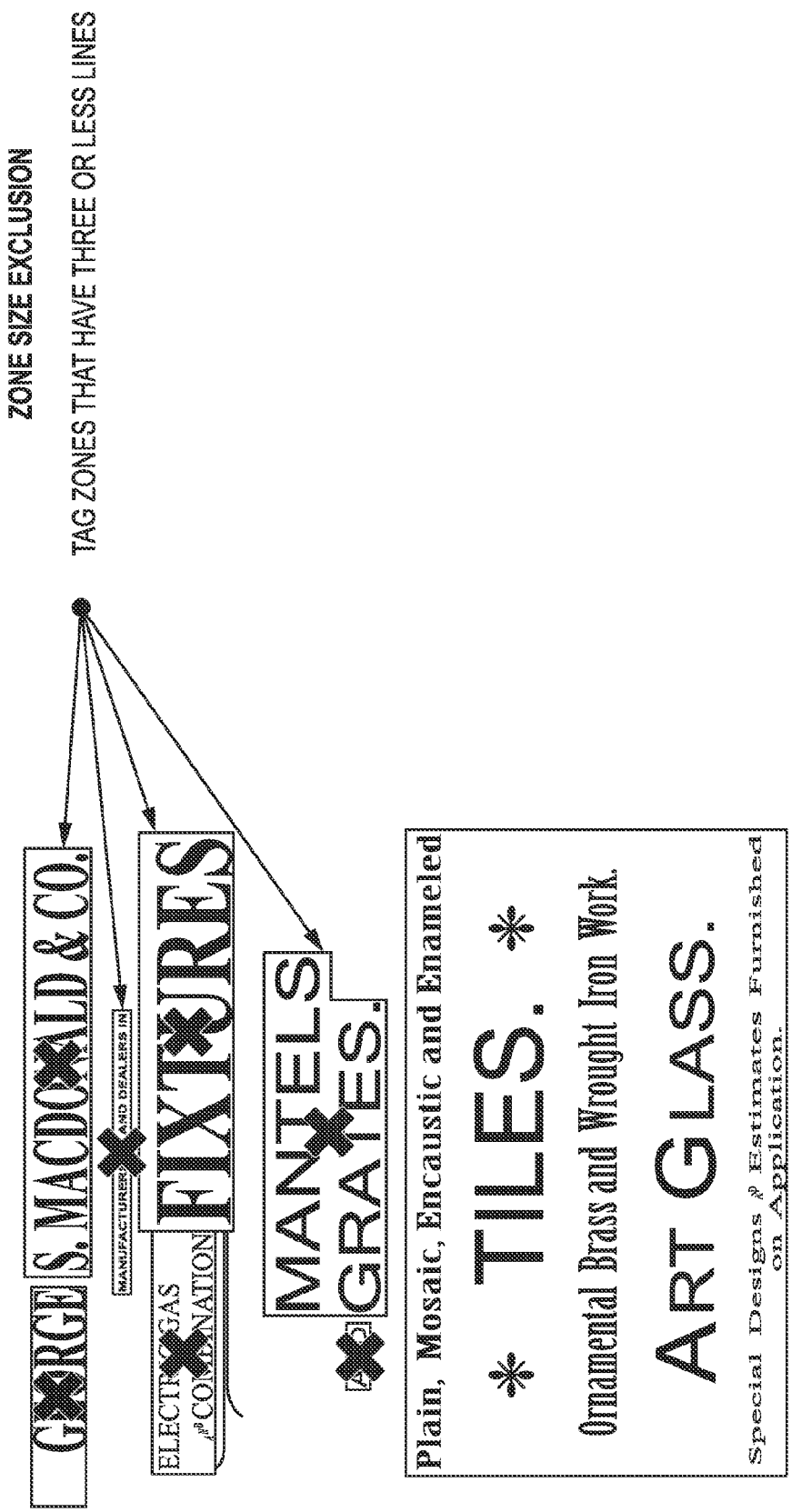
Figure 5:
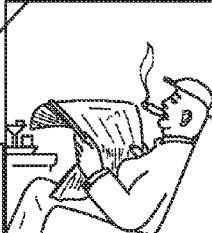

The evaluation of zone characteristics is illustrated by examples seen in FIGS. 4 through 10. As to zone size characteristics, the system is programmed to tag or mark any zones that have three or fewer lines. Such zones are likely to be advertising text which would not be useful in the digitized directory, and as illustrated in FIG. 4, zones having a zone size characteristic of three or fewer lines of text are tagged. The system is also programmed to tag any zones having a zone size characteristic where the X or horizontal dimension of the zone (when the directory is oriented in a standard position for reading by a user) is less than ten characters. Such zones are likewise likely to be advertising (e.g., along the right or left hand margins of a page), and are tagged as illustrated in FIG. 5.

Figure 6:
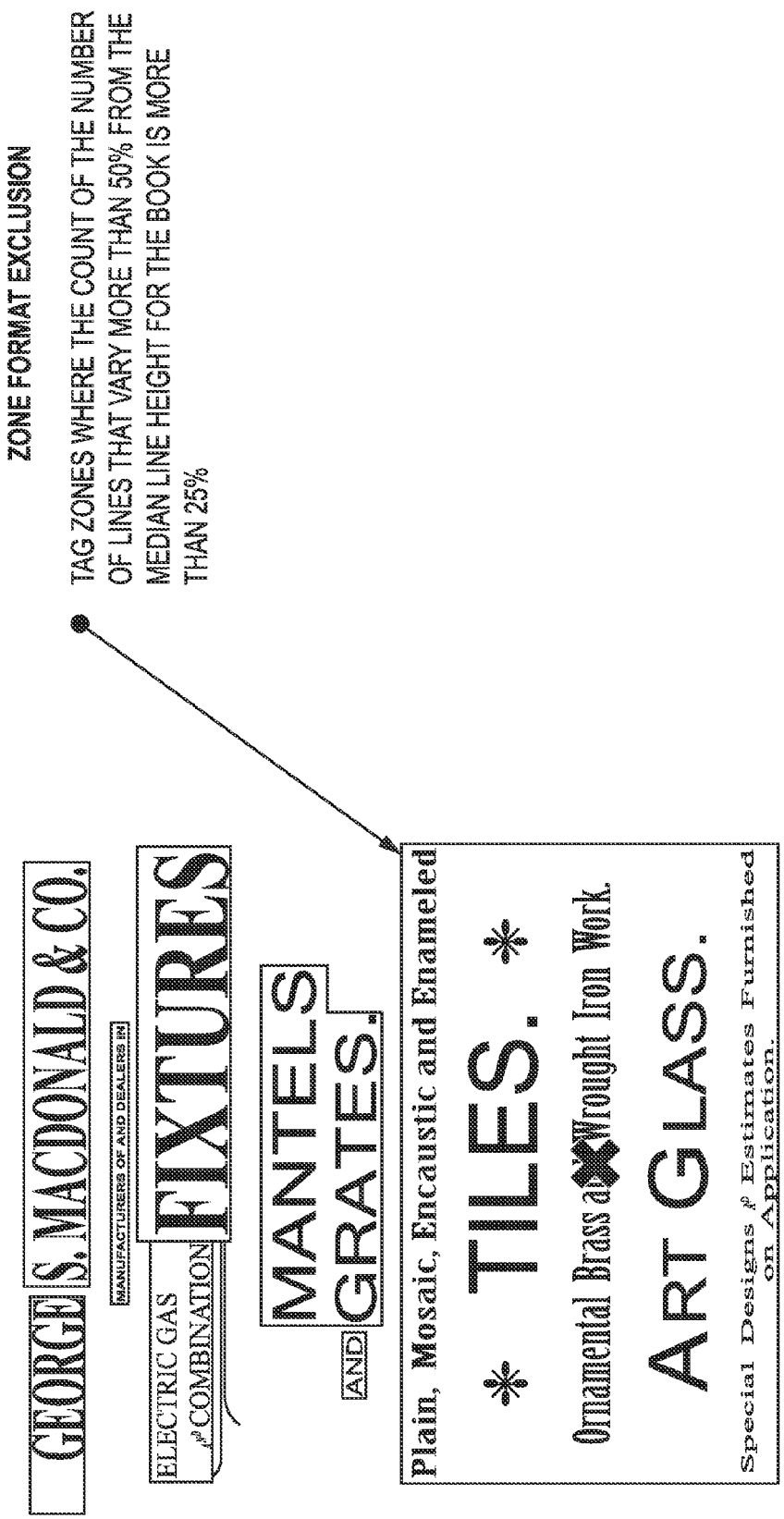

As to zone format characteristics, the system is programmed to tag any zone where more than 25% of the lines vary more than 50% from the median line height for the directory. These zones are also likely to be advertising, and they are tagged as illustrated in FIG. 6.

Figure 7:
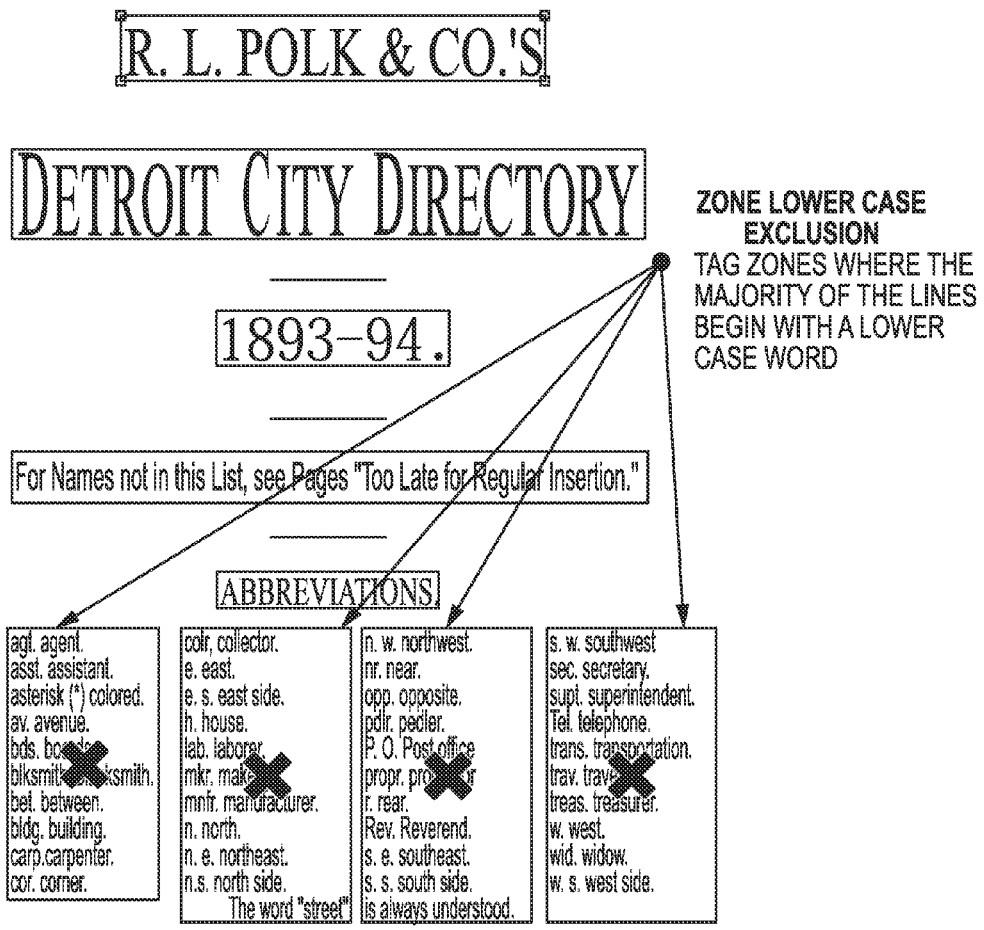

As to lower case characteristics, the system will tag any zone where the majority of lines begin with a lower case word. Such zones are likely to be lists of words and abbreviations (rather than lists of names of residents), and they are tagged as illustrated in FIG. 7.

As to index characteristics, the system will tag any zone where there is a pattern of dots or periods leading to a number. Such zones are likely to be an index, and they are tagged as illustrated in FIG. 8.

As to paragraph characteristics, the system will tag any zone where there are indented lines, where the first letter of each indented line is capped, and where each such indented line is followed by one or more lines that have a full left alignment. Such zones are likely to be informational text (rather than name/address listings), and they are tagged as illustrated in FIG. 9.

Finally, as to address/number first characteristics, the system will tag any zone where more than 25% of the lines in the zone begin with a number. Such zones are likely to be an address first directory listings (listings starting with an addresses, followed by name or other information) or similar number first listings (information organized by a numerical designation). Such zones are tagged as illustrated in FIG. 10.

Returning to FIG. 3, at step 326, each of the tagged zones (having the identified zone size characteristics, zone format characteristics, lower case characteristics, index characteristics, paragraph characteristics, and address/number first characteristics) are excluded or removed from the digitized directory.

Next, the system analyzes each of the remaining zones in order to convert the data (corresponding to a single person in the directory) into a single line or entry, each entry having a name (and any other useful information associated with that name). This processes will be described in greater detail shortly in conjunction with FIGS. 11-26, but is illustrated in simplified form in FIG. 3 as steps 330, 334, 336 and 338.

In particular, at step 330, the lines of each zone are reviewed for certain characteristics for the purpose of classifying the lines and certain words within the lines. At step 334, the system processes dittos and processes line wraps (any line that is a continuation of a preceding line). At step 336 certain lines (not having useful information) are removed from the digitized document. Finally, at step 338, the remaining lines are re-constructed, including appending any wrapped line to the prior line with which it is associated.

Turning now FIGS. 11A and 11B, more detailed steps corresponding to steps 330-338 in FIG. 3 will be described.

At step 1110, there is an initial review of all lines in each text zone (zones remaining after certain zones have been removed at step 326, FIG. 3). The lines are initially reviewed for characteristics that would classify all lines into to one of five categories: 1) EmptyLine, 2) UnknownLine, 3) TallLine, 4) ExcludedLine and 5) WorkingLine. The basis for such classification is as follows:

EmptyLine—any line without any words
UnknownLine—any line with only a single character
TallLine—any line whose average character height for all words in that line is 33% taller than the average character height for all words in the entire document
ExcludedLine—any line that contains words from a Line Exclusion Dictionary (to be described shortly)
WorkingLine—Any line not falling into one of the four preceding categories In connection with an ExcludedLine, the Line Exclusion Dictionary is a list of words that, when appearing in a line, make that line unlikely to have useful information. The following Table illustrates words that could be found in the Line Exclusion Dictionary:

| Line Exclusion Dictionary Table |
|---|
| See also |
| see also |
| See page |
| see page |
| Continued |
| continued |
| cont'd |
| Cont'd |
| contd |
| Contd |
| See Also |

As examples, the following three lines would each be classified as an ExcludedLine based their each having words found in the Line Exclusion Dictionary:

"Bowlin—Continued"
"High Prairie Township—Contd"
"Bowlin see also Bohland and Boland"

Once all the lines have been categorized as EmptyLine, UnknownLine, TallLine, ExcludedLine or WorkingLine, each line is tagged or marked to reflect its category, step 1112.

The system then reviews each line that has been tagged as a WorkingLine, in order to identify words that will be helpful in later re-classifying those lines or in combining those lines with other lines, step 1118. More specifically, each WorkingLine is reviewed for four categories of words: 1) EmptyWord, 2) HyphenWord, 3) DittoWord and 4) WorkingWord. The basis for such classification is as follows:

EmptyWord—any word with no characters (e.g., an OCR system may convert/designate an image as a text word, but such word only has white space, i.e., no characters appearing in the word).
HyphenWord—any word that ends in a hyphen or a dash
DittoWord—any word that is or begins with a character in a Ditto Dictionary (shown in the Ditto Dictionary Table below)
WorkingWord—any remaining word not falling into one of the three preceding categories

| Ditto Dictionary Table |
|---|
| " |
| " |
| -- |
| - |
| __ |
| ii |

The words identified as EmptyWord, HyphenWord, DittoWord and WorkingWord are classified as such, step 1122, by attaching an identifier to such word in the system.

The system next looks at each line previously tagged as a WorkingLine to find undesirable words that are defined as a JunkWord, step 1124.

JunkWords are used to detect left margin problems, such as problems resulting from text that runs vertically within the margin, or graphics in the left margin that have been wrongly interpreted as text.

JunkWords are determined by rules to be described shortly, some of which use a suspicious or "low OCR confidence" designation assigned to characters or words output by the OCR system 206. These designations are used by commercially available OCR systems (such as those referenced earlier), based on such OCR systems finding that the text read and converted is abnormal due to unusual spellings, format, size, unrecognizable characters, and other apparent aberrations. OCR systems use various means to designate a suspicious word, such as by marking the word with a special character.

Turning now to the JunkWord rules, the system 204 classifies any of the following words as JunkWords:

1. The word is short (less than or equal to three characters) and has been designated by the OCR system as suspicious (low OCR confidence).

2. The word contains no letters or numbers.

3. The word has been designated suspicious and is followed by a longer than usual space (e.g., in one embodiment, a longer than usual space is any space that is 80% greater than the normal space between words).

4. The word (even in not designated suspicious) is followed by whitespace that is greater than a predetermined maximum whitespace (e.g., in one embodiment, the maximum whitespace is any whitespace that is 400% greater than the normal space between words).

5. The word is the first word in a line and consists of only one of the following characters: "I", "i", or "1" (often the result of wrongly interpreted images within the left vertical margin).

These JunkWord rules are checked against each word, starting at the beginning of the line, until a non-JunkWord is reached (thus a JunkWord is only found at the beginning of a line or following an already designated JunkWord).

If 80% or more of the words in any WorkingLine are a JunkWord, that line is reclassified as a JunkLine, step 1128.

Indents for each line are then identified. This is accomplished in two steps. First, at step 1130, the amount of indent space for every WorkingLine is calculated relative to the immediately preceding line (it should be noted that it may be useful to track the left margins of the WorkignLines in order to permit the system to accommodate any skew or drift in the vertical margins that might arise during optical scanning)

Next, the number of indents is calculated for and assigned to each WorkingLine, step 1134. This is done by determining the minimum indent space for all WorkingLines in the zone being reviewed, and then dividing the indent space at each WorkingLine by the minimum indent space (and rounding that result to the nearest whole number/integer).

The system next reviews the characteristics of each WorkingLine, in order to identify any line that is a WrappedLine (a line that is a continuation of and that will need to be appended to its immediately preceding line), step 1136. A WorkingLine is determined to be a WrappedLine (and is re-classified as such) at step 1136 if it meets any one of the following three criteria:

1) the line begins with a word that contains only lower case letters or numbers,
2) the line is indented and is short (contains three or fewer words, excluding any JunkWord and EmptyWord), or
3) the line has more than one indent.

After each WrappedLine is identified and tagged, each EmptyLine, JunkLine and UnknownLine is then removed from the digitized directory, step 1140.

Next, each WrappedLine is appended to the immediately preceding non-WrappedLine, step 1142 (note, that if there are several consecutive WrappedLines, they are each appended (in order) to the non-WrappedLine that immediately precedes them—the line with which they are all associated). In appending a WrappedLine to its preceding line, indents are removed and any HyphenWord has its hyphen removed.

Various examples of a WrappedLine being appended to a preceding line are shown in FIGS. 12-18. In each of these Figures, there are illustrated, under appropriate headings, listings from a city directory ("Listings"), Wrapped Lines that are identified in those listings ("WrappedLines"), and the manner in which WrappedLines are reconstructed or rebuilt with their preceding or previous lines ("Reconstructed Lines"). Specifically, FIG. 12 illustrates examples of WrappedLines that are reconstructed based on those lines beginning with a lower case letter, or beginning with a number, or having more than one indent (e.g., a double indent). FIG. 13 illustrates examples of WrappedLines that are reconstructed based on those lines beginning with a lower case letter or having more than one indent. FIG. 14 illustrates examples of WrappedLines that are reconstructed based on those lines beginning with a lower case letter. FIG. 15 illustrates examples of WrappedLines that are reconstructed based on those lines beginning with a lower case letter, or beginning with a number, or having more than one indent.

FIG. 16 illustrates examples of WrappedLines that are reconstructed based on those lines beginning with a lower case letter, or beginning with a number, or having more than one indent. FIG. 17 illustrates examples of WrappedLines that are reconstructed based on those lines having more than one indent. FIG. 18 illustrates examples of WrappedLines that are reconstructed based on those lines beginning with a lower case letter, or beginning with a number, or having more than one indent.

Returning to FIGS. 11A and 11B, the system then resolves any lines that may use dittos. This is done by saving the first word from every WorkingLine and ExcludedLine, unless the first word of that line is a DittoWord or unless the line has an indent, step 1146. Next, at step 1148, for any WorkingLine or ExcludedLine that begins with a DittoWord or with a single indent (indicating a ditto), that DittoWord or indent is replaced with the word from the preceding line that was saved at step 1146 (if the DittoWord includes characters after a ditto character, those characters are kept in the line and are not replaced). Note that, based on conventions observed in city directories, a single indent is indicative of a ditto, whereas a double (or greater) indent is, as mentioned earlier, indicative of a WrappedLine (rather than a ditto).

Various examples of resolving lines that use dittos are shown in FIG. 19-26. In each of these Figures, there are illustrated, under appropriate headings, listings from a city directory ("Listings") and lines having dittos that are reconstructed ("Reconstructed Lines"). FIGS. 19, 21, 23 and 26 each illustrate examples of reconstructed lines where a ditto is represented by a single indent. FIGS. 20 and 22 illustrate examples of reconstructed lines where a ditto is represented by a traditional ditto mark (i.e., the mark "). FIG. 24 illustrates examples of reconstructed lines where a ditto is represented by a double dash. FIG. 25 illustrates examples of reconstructed lines where a ditto is represented by an em dash.

Next, returning to FIGS. 11A and 11B, indents are removed from any WorkingLine and any ExcludedLine, step 1150, and if any WorkingLine or any ExcludedLine has a word beginning with a 0' (zero and apostrophe) it is replaced with a O', step 1152 (this corrects some names that, either when originally printed or when converted during OCR, have had a zero character substituted for the capitalized letter "O"). Then, the first word of each WorkingLine and ExcludedLine is reviewed for a noisy first word (i.e., proper case word with appended number or character), and the noisy word is replaced with the proper case word, step 1154. For example, if the first word is "1O'Connor," it is replaced with the proper case word "O'Connor" at step 1154.

Finally, at step 1160, any remaining WrappedLine, TallLine and ExcludedLine are removed from the zone in the digitized record.

Figure 11A:
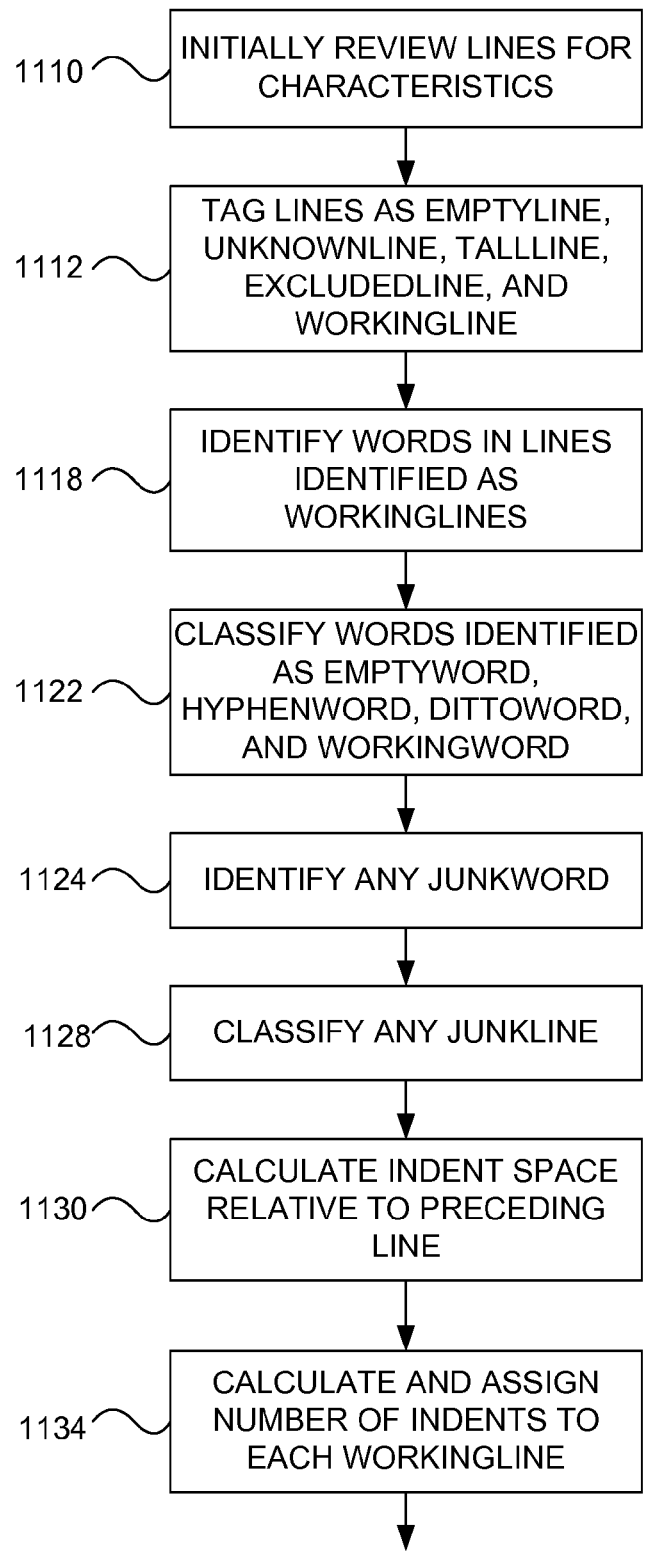
FIGS. 11A and 11B are, taken together, a flow diagram illustrating in greater detail the steps involved in reviewing lines and words, processing line wraps and dittos, removing lines, and re-constructing lines, in order to provide a digitized city directory.
Figure 11B:
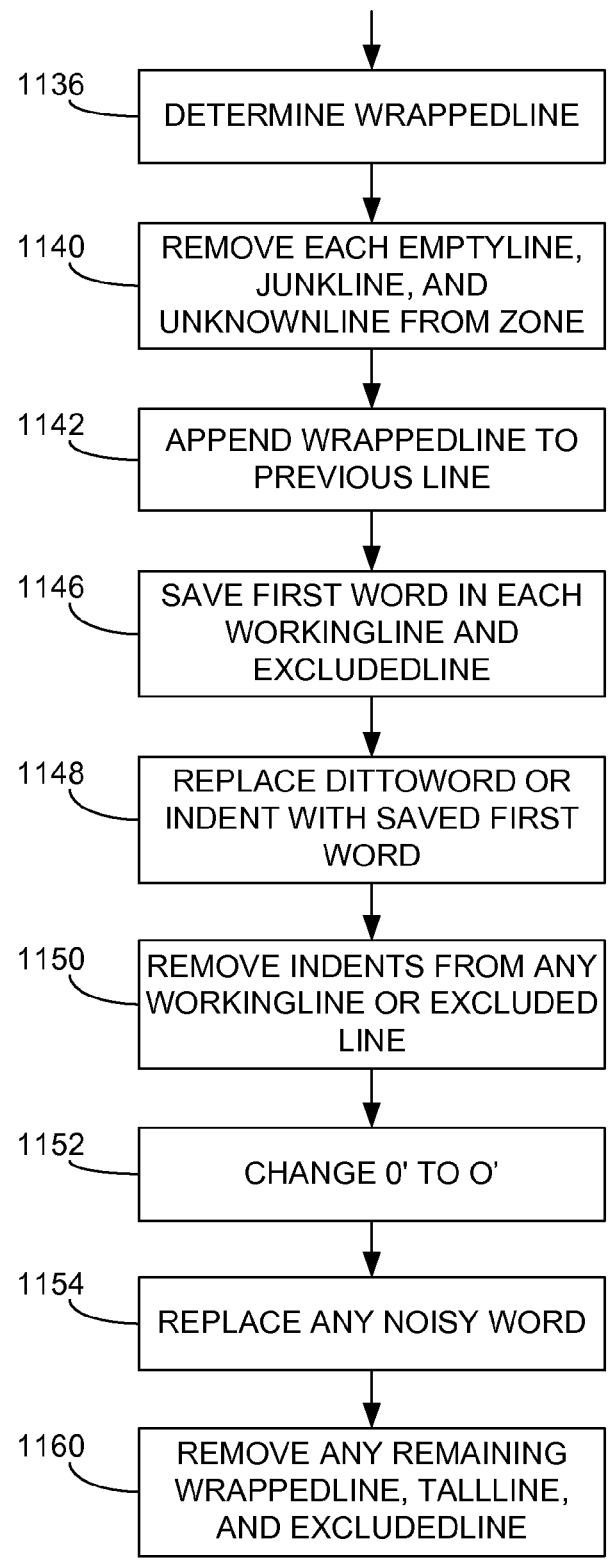

All of the steps illustrated in FIGS. 11A and 11B are repeated as necessary for each of the other zones. Alternatively, in some embodiments, the steps of FIGS. 11A and 11B could be performed on all zones at the same time.

After completion of the processes shown in FIG. 3 and FIGS. 11A and 11B, the resulting lines in the digitized directory are each a line or entry that include a resident's name and that have, as part of that same line, information from the directory pertaining to that name. Any irrelevant information (advertising, indexes, headings, informational text) have been removed, all wrapping lines have been combined as appropriate, and any ditto lines have had the relevant information (e.g., last name) inserted in the place of the ditto designation.

Figure 27:
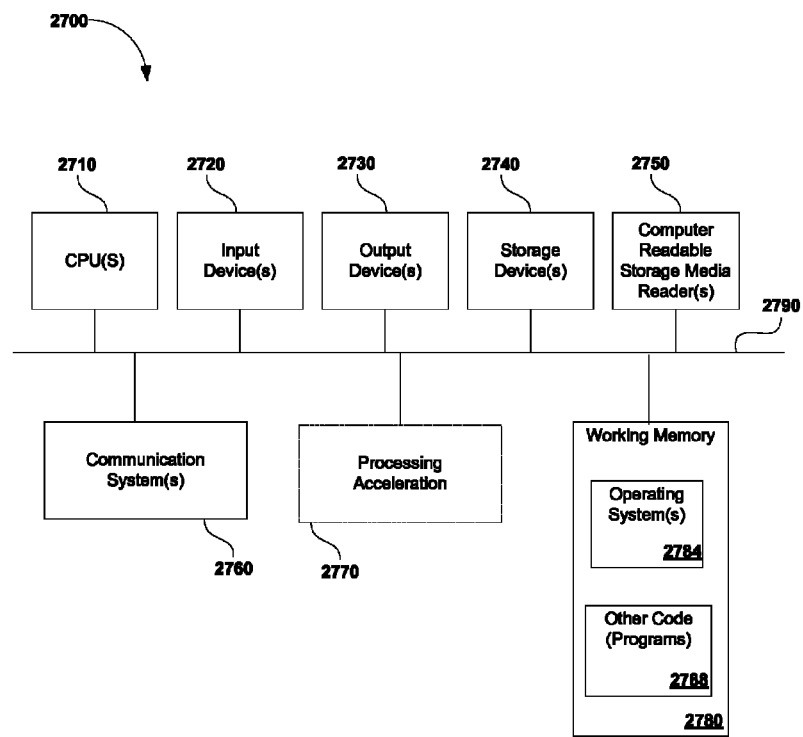
FIG. 27 is a block diagram of a computer system upon which various devices, systems, and processes described herein may be implemented.

Turning now to FIG. 27, there is illustrated a block diagram of an exemplary computer system upon which embodiments of the present invention may be implemented. This example illustrates a computer system 2700 such as may be used, in whole, in part, or with various modifications, to provide the functions of the document processing system 204 (including the OCR system 206, document processor 208 and the memory system 210), as well as other components and functions of the invention described herein.

The computer system 2700 is shown comprising hardware elements that may be electrically coupled via a bus 2790. The hardware elements may include one or more central processing units 2710, one or more input devices 2720 (e.g., a mouse, a keyboard, etc.), and one or more output devices 2730 (e.g., a display device, a printer, etc.). The computer system 2700 may also include one or more storage devices 2740, representing remote, local, fixed, and/or removable storage devices and storage media for temporarily and/or more permanently containing computer-readable information, and one or more storage media reader(s) 2750 for accessing the storage device(s) 2740. By way of example, storage device(s) 2740 may be disk drives, optical storage devices, solid-state storage device such as a random access memory ("RAM") and/or a read-only memory ("ROM"), which can be programmable, flash-updateable or the like.

The computer system 2700 may additionally include a communications system 2760 (e.g., a modem, a network card—wireless or wired, an infra-red communication device, a Bluetooth™ device, a near field communications (NFC) device, a cellular communication device, etc.) The communications system 2760 may permit data to be exchanged with a network, system, computer, mobile device and/or other component as described earlier. The system 2700 also includes working memory 2780, which may include RAM and ROM devices as described above. In some embodiments, the computer system 2700 may also include a processing acceleration unit 2770, which can include a digital signal processor, a special-purpose processor and/or the like.

The computer system 2700 may also comprise software elements, shown as being located within a working memory 2780, including an operating system 2784 and/or other code 2788. Software code 2788 may be used for implementing functions of various elements of the architecture as described herein. For example, software stored on and/or executed by a computer system, such as system 2700, can be used in implementing the processes seen in FIGS. 3 and 11A and 11B.

It should be appreciated that alternative embodiments of a computer system 2700 may have numerous variations from that described above. For example, customized hardware might also be used and/or particular elements might be implemented in hardware, software (including portable software, such as applets), or both. Furthermore, there may be connection to other computing devices such as network input/output and data acquisition devices (not shown).

While various methods and processes described herein may be described with respect to particular structural and/or functional components for ease of description, methods of the invention are not limited to any particular structural and/or functional architecture but instead can be implemented on any suitable hardware, firmware, and/or software configuration. Similarly, while various functionalities are ascribed to certain individual system components, unless the context dictates otherwise, this functionality can be distributed or combined among various other system components in accordance with different embodiments of the invention. As one example, the document processing system 204 may be implemented by a single system having one or more storage device and processing elements. As another example, the document processing system 204 may be implemented by plural systems, with their respective functions distributed across different systems either in one location or across a plurality of linked locations.

Moreover, while the various flows and processes described herein (e.g., those illustrated in FIGS. 3, 11A and 11B are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments may be described with (or without) certain features for ease of description and to illustrate exemplary features, the various components and/or features described herein with respect to a particular embodiment can be substituted, added, and/or subtracted to provide other embodiments, unless the context dictates otherwise. Further, the term "exemplary" used herein does not mean that the described example is preferred or better than other examples.

Consequently, although the invention has been described with respect to exemplary embodiments, it will be appreciated that the invention is intended to cover all modifications and equivalents within the scope of the following claims.

What is claimed is:

1. A computerized method for capturing relevant information scanned from a printed document, the document having at least some information arranged in lines, the method comprising:
converting the scanned information into computer readable text;
defining zones of the document, with the computer readable text assigned to one of the zones;
applying rules to the zones of the document, in order to identify information in the zones that is not relevant;
excluding any zone of the document having information that is not relevant;
applying rules to the information remaining after the step of excluding, the rules identifying a line in a remaining zone that is associated with another line; and
combining the identified line and its associated line into a reconstructed line.

2. The method of claim 1, wherein the scanned information is in the form of images, and wherein an optical character recognition (OCR) system is used to convert the scanned information into computer readable text.

3. The method of claim 2, wherein the zones of the document are text zones, and wherein the OCR system creates the text zones from, at least in part, analysis of the computer readable text converted by the OCR system from the scanned information.

4. The method of claim 3, wherein the step of excluding includes removing a text zone from the document based on one or more of zone size characteristics, zone format characteristics, lower case characteristics, index characteristics, paragraph characteristics, and address/number first characteristics.

5. The method of claim 4, wherein:
zone size characteristics comprise having three or fewer lines in a zone or the X or horizontal dimension of a zone being less than ten characters.

6. The method of claim 4, wherein:
zone format characteristics comprise more than 25% of the lines in a zone varying more than 50% from the median line height for the document.

7. The method of claim 4, wherein:
lower case characteristics comprise a majority of lines in a zone beginning with a lower case word.

8. The method of claim 4, wherein:
index characteristics comprise a pattern of dots or periods in a zone leading to a number.

9. The method of claim 4, wherein:
paragraph characteristics comprise indented lines in a zone, where the first letter of each indented line is capped, and where each such indented line is followed by one or more lines that have a full left alignment.

10. The method of claim 4, wherein:
address/number first characteristics comprise more than 25% of the lines in a zone beginning with a number.

11. The method of claim 1, further comprising:
identifying a line of information as including a ditto designation; and
adding a word, from a line preceding the identified line including the ditto designation, to the identified line that includes the ditto designation.

12. The method of claim 11, wherein identifying a line as including a ditto designation comprises determining that a first word in a line includes at least a character from a ditto dictionary, characters in the ditto dictionary being characters indicating a word in a line above the ditto character is part of the line that includes the ditto designation.

13. The method of claim 1, further comprising identifying a line as a wrapping line, the wrapping line being a continuation of a preceding line, and wherein the step of combining the identified line and its associated line comprises combining the identified wrapping line with the preceding line.

14. The method of claim 13, wherein identifying a line as a wrapping line comprises determining that a line comprises at least one of:
a line that begins with a word that contains only lower case letters or numbers,
a line that is indented and contains three or fewer words, and
a line that has more than one indent.

15. The method of claim 1, wherein the printed document is a historical record.

16. The method of claim 15, wherein the historical record is a city directory.

17. The method of claim 1, wherein the arranged information remaining after the step of excluding comprises one or more of names, addresses, and occupations.

18. The method of claim 1, wherein the arranged information that is not relevant comprises one or more of advertising, lists of lower case words and abbreviations, indexes, information text, address first listings, and number first listings.

19. A computerized method for capturing relevant information scanned from a printed document, the document having at least some information arranged in lines, the method comprising:
converting the scanned information into computer readable text;
defining zones of the document, with the computer readable text assigned to one of the zones;
applying rules to the zones of the document, in order to identify information in the zones that is not relevant;
excluding any zone of the document having information that is not relevant; and
identifying a line in a remaining zone as a wrapping line, the wrapping line being a continuation of a preceding line; and
combining the identified wrapping line with the preceding line.

20. The method of claim 19, wherein identifying a line as a wrapping line comprises determining that a line comprises at least one of:
a line that begins with a word that contains only lower case letters or numbers;
a line that is indented and contains three or fewer words; and
a line that has more than one indent.

21. A computerized method for capturing relevant information scanned from a printed document, the document having at least some information arranged in lines, the method comprising:
converting the scanned information into computer readable text;
defining zones of the document, with the computer readable text assigned to one of the zones;
applying rules to the zones of the document, in order to identify information in the zones that is not relevant;
excluding any zone of the document having information that is not relevant;
identifying a line in a remaining zone as including a ditto designation; and
adding a word, from a line preceding the line that includes the ditto designation, to the line having the ditto designation.

22. The method of claim 21, wherein identifying a line as including a ditto designation comprises determining that a first word in a line includes a character from a ditto dictionary, characters in the ditto dictionary being characters used to indicate a word in a line above the ditto character is part of the line that includes the ditto designation.

* * * * *